United States Patent
Zeiters

[11] 3,763,695
[45] Oct. 9, 1973

[54] ULTRASONIC TESTING DEVICE
[75] Inventor: Donald L. Zeiters, Shelby, Ohio
[73] Assignee: Copperhead Steel Company, Pittsburgh, Pa.
[22] Filed: Jan. 12, 1972
[21] Appl. No.: 217,370

[52] U.S. Cl. ............................................. 73/71.5 U
[51] Int. Cl. ........................................... G01n 29/04
[58] Field of Search ................. 73/67.5–67.9, 71.5 U

[56] References Cited
UNITED STATES PATENTS
| | | | |
|---|---|---|---|
| 3,413,843 | 12/1968 | Kortenhoven | 73/71.5 |
| 3,056,285 | 10/1962 | Gibson et al. | 73/67.8 |
| 3,077,768 | 2/1963 | Allardt et al. | 73/67.8 |
| 3,678,735 | 7/1972 | Boulanger et al. | 73/67.7 |

Primary Examiner—Richard C. Queisser
Assistant Examiner—John P. Beauchamp
Attorney—Buell, Blenko & Ziesenheim

[57] ABSTRACT

The specification discloses an ultrasonic testing device for non-destructively testing electrically welded steel tubing. The device comprises a mechanical mounting arrangement for one or more ultrasonic transducers which automatically tracks the path of movement of steel tubing through the device to insure substantially uniform positioning of the transducers with respect to the tubing notwithstanding deviations in the path of movement of the tubing. The device includes a box having a pair of aligned sealed openings through which the tubing passes, and in which the tubing and the ultrasonic transducers may be immersed in water which serves as a couplant for transmission of sound waves emitted from the transducers to the tubing and reflected back to the transducers.

10 Claims, 5 Drawing Figures

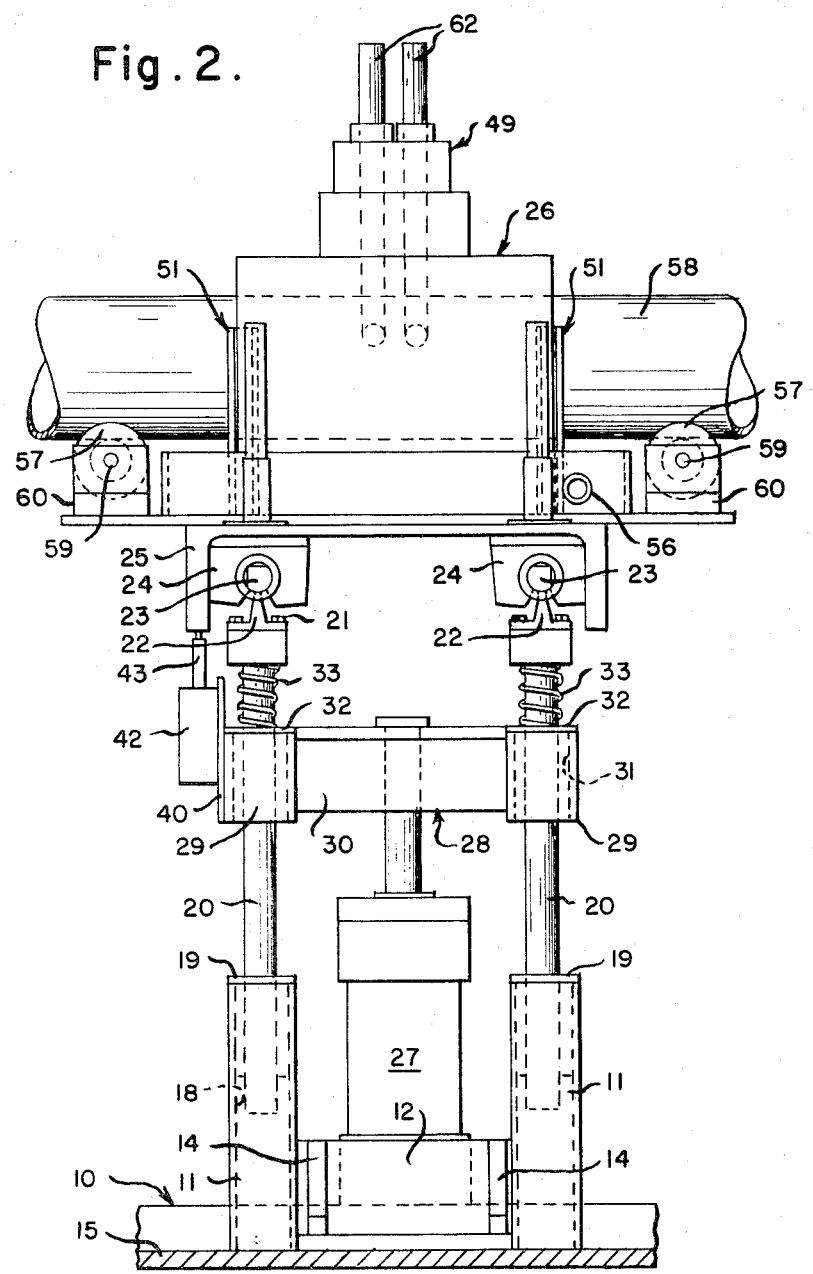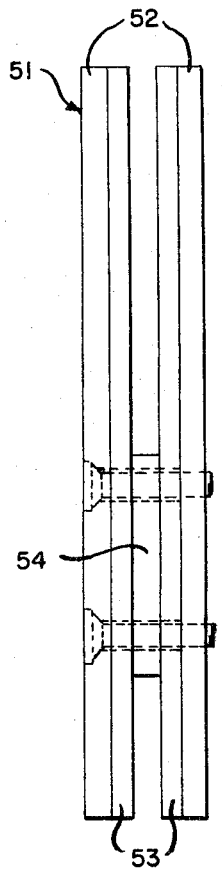

ULTRASONIC TESTING DEVICE

This invention relates to devices for non-destructively testing electrically welded steel tubing, as by ultrasonic transducers mechanically positioned relative to the tubing as it moves from one station, such as a sizing station, to another station, such as the cut-off station.

Apparatus for non-destructively testing electrically welded steel tubing by the use of ultrasonic transducers has been heretofore known and employed. However, such apparatus has proved unsatisfactory for the reason that the inspection transducer has to be calibrated in a calibration box and then shifted to the test box. The movement of the inspection transducer causes changes in the adjustment which nullify the calibration. Moreover, the inspecting transducer is set up in a fixed position and thus, due to deviations in the path of movement of the tubing and irregularities in the tubing itself, the probe of the transducers does not focus continuously at the same level or point along the tubing with movement of the tubing.

In order to avoid the disadvantages and inaccuracies of the foregoing testing apparatus, I propose to provide an improved testing apparatus in which a mechanical mounting arrangement for an ultrasonic transducer automatically and exactly follows, that is tracks, the movements of the electrically welded steel tubing so as to maintain uniformity of physical relationship between the tubing and the inspecting probe.

More specifically, I propose to provide mounting apparatus for an ultrasonic testing device having tracking means in the form of a plurality of contoured rollers on which the tubing is supported and moves, the rollers being in yielding contact with the tubing and moved in vertical and horizontal directions responsively to deviations in the path of movement of the tubing, thereby to automatically and correspondingly adjust the position of the ultrasonic testing device so as to maintain the necessary uniformity of physical relationship between the tubing and the testing device.

I furthermore provide mounting apparatus for an ultrasonic transducer comprising a test box having an open top and side walls with a pair of aligned circular recesses in which a pair of double-lipped elastomeric seals, such as neoprene, provide a sealed barrier against loss of water from the box with the tubing moving through the recesses. The tubing is thus immersed in water and the inspection probe of the transducer is submerged thereunder, the water providing a couplant through which sound waves emitted from the probe are transmitted to and reflected back from the tubing.

I additionally provide a testing device in which the test box and seal plates are made of high strength aluminum which provides a maximum resistance to corrosion and is of relatively light weight for easy handling. Moreover, in the testing device which I provide, the test box has sufficient stability that the test instrument mounted thereon may be calibrated in place without removing the test box from the mill, thus avoiding the possibility of maladjustment of the inspection probe after calibration.

The above mentioned features are embodied in a presently preferred embodiment of my invention, shown in the accompanying drawings, wherein:

FIG. 2 is a side elevational view;

FIG. 5 is a profile view, on enlarged scale, of a seal assembly.

Figure 1:
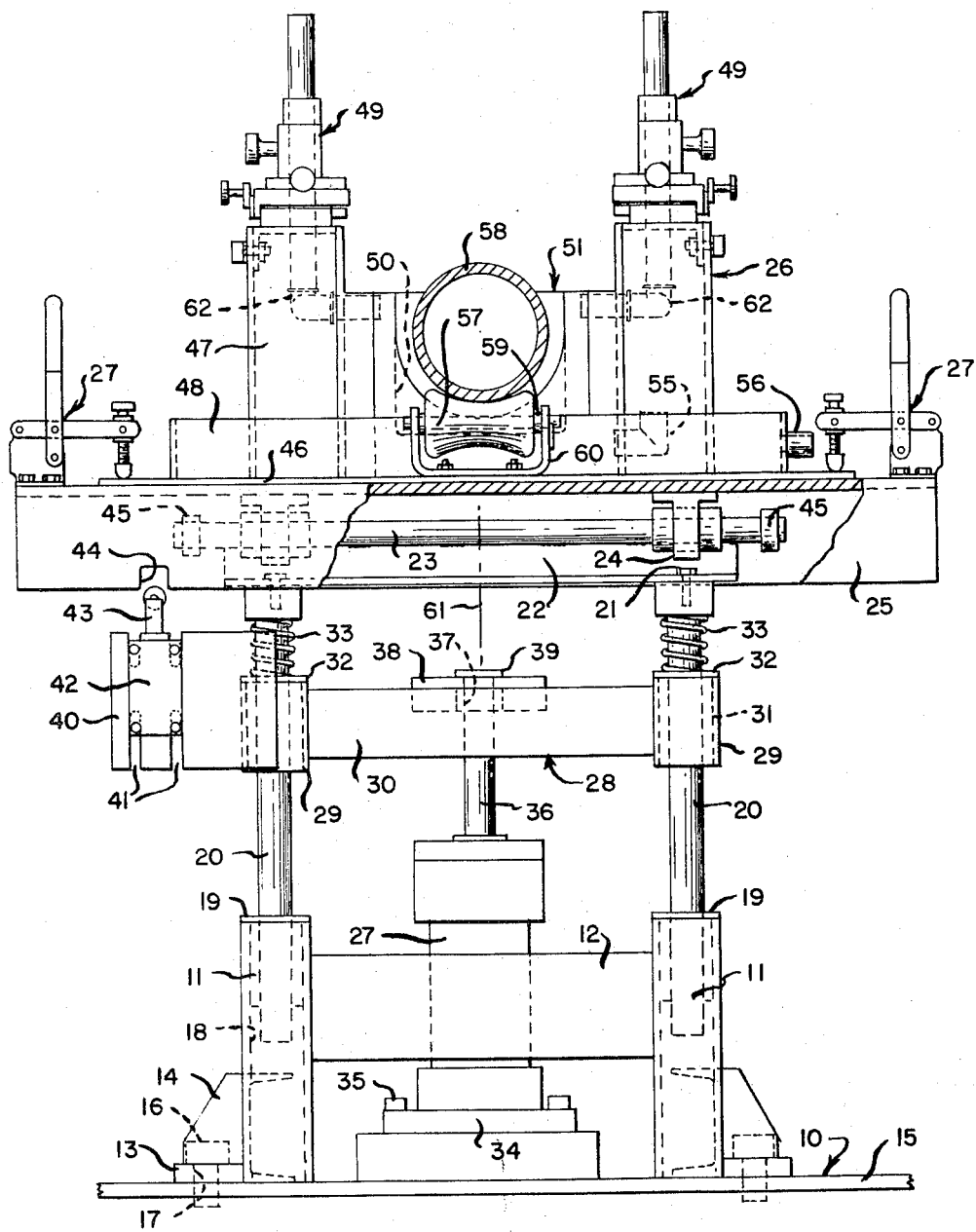
FIG. 1 is a front elevational view, a fragment being broken away for clarity.

Referring to the drawings, the embodiment of the testing device 10 shown comprises a generally rectangular base weldment having a guide column 11 at each of the four corners supported in a vertical position by tie channels 12 extending therebetween and welded thereto. A mounting plate 13 is provided at opposite ends of the base weldment attached as by welding to the guide columns 11 and tie channels 12. A pair of gusset plates 14 interposed in the angle between each mounting plate 13 and the tie channels 12 between guide columns serves to strengthen the structure. The entire weldment rests on a base plate 15 and is secured thereto by screws 16 extending through holes 17 in the end mounting plates.

Each of the guide columns 11 has a central bore 18, in the upper end of which is supported a flanged bearing bushing 19. Telescopically supported in slidable relation in each of the bearing bushings 19 is a vertically extending guide pin 20. Secured as by screws 21 to the upper face of the enlarged end of guide pins 20, in parallel spaced relation, are a pair of carrier shaft support rails 22, (FIG. 2) each rail having a carrier shaft 23 secured in longitudinal alignment with the top edge of the rail as by screws (not shown).

Supported on the carrier shafts 23 through intervening pillow blocks 24 of the open ball bushing type is a platform channel 25, to the top face of which a test box 26 is removably attached as by a plurality of toggle clamps 27. The pillow blocks 24 are dependingly attached as by screws to the lower surface of the channel 25, two blocks engaging each carrier shaft 23 in longitudinally spaced relation.

The platform channel 25 and test box 26 are yieldingly supported in elevated position by an air cylinder 27 through the medidum of a slide base 28. Slide base 28 is a steel weldment of generally rectangular shape comprising four corner guide blocks 29 and tie channels 30 connecting and welded to the blocks. Each of the blocks 29 has a through bore 31, in the upper end of which is fitted a flanged bearing bushing 32. The slide base 28 is mounted for vertical slidable movement on the guide pins 20 which extend through the bearing bushing 32 in corresponding guide blocks 29. A plurality of helical springs 33, each disosed concentrically around a corresponding guide pin 20 in intervening relation between the shoulder of the enlarged end of the guide pin and the flange of the bearing bushing 32, serve to yieldingly support the platform channel and test box. Shims in the form of washers may be interposed between the springs 33 and the bearing bushings 32 to provide adjustment to obtain appropriate working height for the platform and test box.

The air cylinder 27 has a flanged base 34 at one end, which is attached as by screws 35 to the base plate 15. The piston rod 36 of the cylinder extends vertically upward from the opposite end and is screwed into a tapped bore 37 in a cross plate 38 bridging and welded to opposite tie channels 30 of the slide base. The connection of the piston rod 36 to the cross-plate 38 is reinforced by a collar 39 welded to the cross-plate and having a tapped bore forming an extension of the tapped bore 37 of the cross-plate.

Attached as by welding to one of the guide blocks 29 of the slide base 28 is a mounting plate 40 having parallel extending slots 41 by which to adjustably mount a microswitch 42. Microswitch 42 has an actuating arm 43 which extends upwardly in registry with a notch or recess 44 cut into the lower edge of one of the side flanges of the platform channels 25. Microswitch 42 is actuated for a desired purpose, such as to provide a signal, by engagement of the arm 43 with the side wall of recess 44 in the flange of the platform channel. Such engagement might occur upon excessive lateral movement of the platform channel 25 from its normal position. The manner in which the platform channel 25 is shifted laterally will be described later. Collars 45 secured as by set screws to the ends of the carrier shafts 23 and engageable by the pillow blocks 24 serve to limit the lateral movement of the platform channel on the carrier shafts 23.

Figure 3:
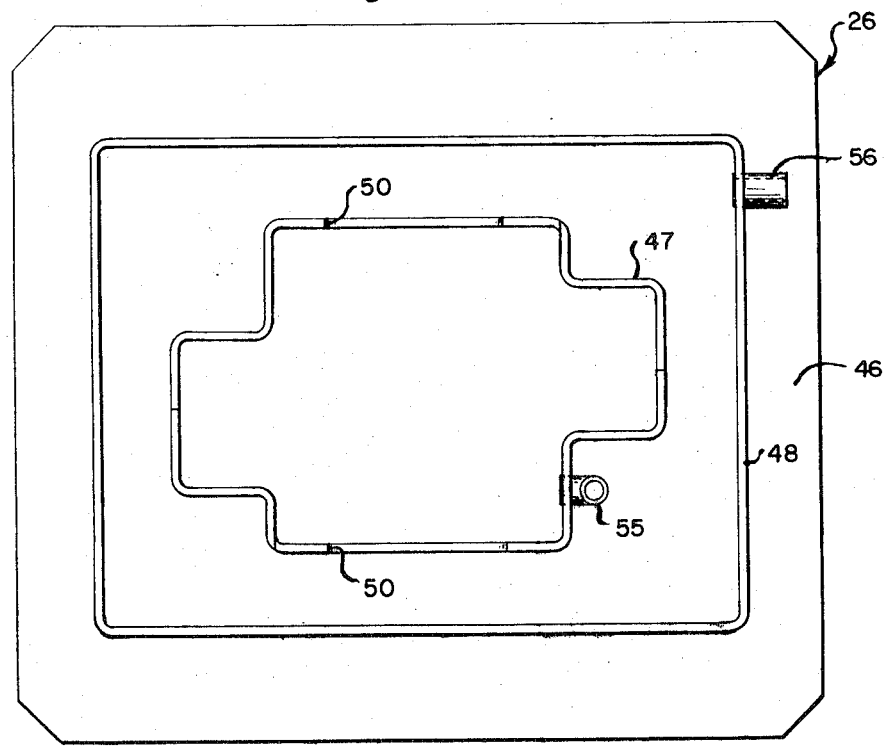
FIG. 3 is a plan view of the test box with testing devices removed, showing the contour and relation of inner and outer enclosure walls thereof.

The test box 26 comprises a bottom plate 45, to which an inner enclosure wall 47 and an outer enclosure wall 48 are welded, as particularly shown in FIG. 3. The plate 46 and enclosure walls 47 and 48 are preferably of aluminum material to minimize the weight of the assembly.

The enclosure walls 47 and 48 severally formed out of single sheets of appropriate thickness (e.g. 0.19 inch), and length, bent into appropriate contour and welded together at the juncture of the opposite ends of the sheet. As will be noted in FIG. 3, the enclosure walls are placed edgewise on the bottom plate 46 and welded thereto. In addition, the inside surface of each wall is sealingly bonded to the bottom plate, as by an epoxy cement, to prevent leakage of water from the interior of the enclosure.

Figure 4:
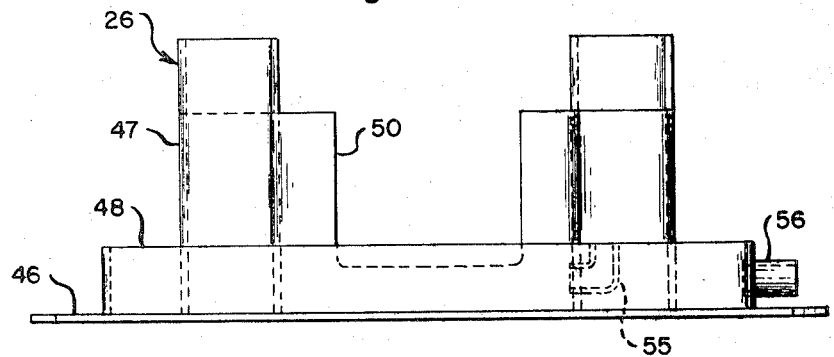
FIG. 4 is an elevational view of the test box, showing additional details of the inner and outer enclosure walls.

As will be seen from FIGS. 1 and 4, the upper edge surface of the inner enclosure wall 47 is of irregular height above the bottom plate 46, the diagonally opposite corner sections being higher relative to the bottom plate than the remaining sections, each corner section serving as a mounting bracket for an ultrasonic testing device 49, hereinafter referred to and described more fully later on.

Two parallel low sections of the enclosure wall 47 contain similar aligned U-shaped openings 50. Attached to the wall as by screws in registry with each opening 50 is a seal assembly 51. As shown in FIG. 5, each seal assembly 51 comprises a sandwich of two outer plates 52 of suitable sheet material, such as aluminum, two inner plates 53 of rubber material such as neoprene, and a separator strip 54 of suitable material such as brass, the assemblage being held together by a plurality of screws extending through the holes in the intervening plates and engaging tapped holes in the outer plate 52. The separator plate is of slightly greater thickness (e.g. 0.20 inch) than is the enclousre wall 47 and thus the seal assemblies 51 are secured to the wall at the U-shaped openings 50 in stradling relation.

Depending on the diameter of tubing to be tested, the outer and inner plates 52 and 53 of the pairs of seal assemblies 51 have circular openings of appropriate diameter, through which tubing to be tested extends. The circular openings in the inner plates 53 of neoprene are somewhat smaller in diameter than the circular openings in the outer plates 52 so as to allow some flexibility in the circular lip of the neoprene seal.

The outer enclosure wall 48, which is relatively low in height compared to the enclosure wall 47, is of four-sided rectangular contour and surrounds the enclosure wall 47 in outwardly spaced relation so as to form a moat therebetween for the collection of water which may spill over the top edge of the inner enclosure wall 47. As will be seen in FIG. 1, water may be supplied to the inner enclosure through a hose connected to an elbow fitting 55 mounted in the enclosure wall adjacent the bottom plate 46. Spillage into the moat formed by the outer wall 48 may be drained through a hose (not shown) connected to a fitting 56 mounted in the outer wall 48.

Mounted outside opposite sides of the outer enclosure wall 48, in alignment with each other and the two seal assemblies 51, are a pair of contoured tracking rollers 57, on which the tubing 58 being tested is supported. As seen in FIG. 1, the rollers 57 are rotatably mounted, as by suitable ballbearing races at each end, on a shaft 59. The opposite ends of shaft 59 extend through holes in spaced arms of a U-shaped bracket 60 attached as by screws to the bottom plate 46, each of the rollers 57 thereby being supported for rotation on a horizontal axis.

The outer surface of each of the rollers 57 is of corresponding shallow symmetrical concave contour, the low point of the concave surface being midway between the opposite ends of the roller.

The tubing 58 resting on rollers 57 tends to seek the low point of the concave surface of the rollers on which to rest. Thus, if the longitudinal axis of the tubing 58 lies in the vertical plane through the center line 61 (FIG. 1) of the tubing device 10, the low point of the concave surface of rollers 57 will correspondingly lie in the same vertical plane. However, if the longitudinal axis of the tubing 58 deviates to right or left out of the vertical plane through the center line 61, the rollers 57 will be shifted correspondingly until the tubing again rests on the low point of the concave surface on the rollers. It will thus be seen that, being attached to and movable with the rollers 57, the test box 26 and the platform channel 25 are also correspondingly shifted laterally by reason of the substantially frictionless pillow blocks 24 supporting the platform channel 25 on the carrier shafts 23.

Obviously, if the tubing 58 deviates different degrees from the vertical plane through the center line 61 of test device 10 at the opposite rollers 57, the rollers 57 will assume an average position corresponding to the average of the different deviations at the different rollers.

The mounting arrangement for rollers 57 will thus be seen to track or follow the longitudinal axis of the tubing so that the physical relation of the tubing and the test box 26 will remain substantially uniform.

The ultrasonic testing devices 49 mounted on the inner enclosure wall 47 of the test box 26 are thus correspondingly positioned in substantially uniform relation to the tubing 58 notwithstanding lateral deviations or irregularities in the path of movement of the tubing 58 through the test box 26.

In the event of irregularities or distortion in the tubing 58 such that the tubing rises from the rollers 57, or conversely, exerts a downward force thereon, the springs 33 biasing the supporting guide pins 20 upwardly expand to maintain the rollers 57 in contact with the tubing or are compressed correspondingly with corresponding upward or downward movement of the platform channel 25 and test box 26 attached thereto.

It will be apparent, therefore, that by reason of the continual yielding engagement of the tracking rollers 57 with the tubing 58 being tested, the plateform channel 25 and test box 26 attached thereto are correspondingly shifted in accordance with deviations in the path of movement of tubing 58 so as to maintain a uniform physical relation therebetween. The importance of maintaining the uniform physical relation between the tubing being tested in the test box will be understood from the fact that the ultrasonic testing devices 49 are provided with tubular inspection probes 62 which are disposed in substantially radial relation to the tubing and the inspection lenses (not shown) adjacent the ends of the probes must remain in substantially constant spaced relation to the outer surface of the tubing. Any variation in the spaced relation of the lenses with respect to the outer surface of the tubing will necessarily affect the accuracy of the reaction to the sound waves as reflected from the tubing being tested. Unless the physical relation between the test box 26 and the tubing 58 is maintained, erroneous indications may result as to the soundness or integrity of the welded section of the tubing. By insuring the uniformity of the physical relation between the test box 26 and the tubing being tested, the embodiment of my invention herein described insures the accuracy of the testing of the tubing.

In operation, the testing device 10 is located in the production line for the tubing between the sizing operation and the equipment for performing a cutting-off operation, that is, to cut the tubing to desired lengths. As viewed in FIG. 2 of the drawings, the tubing moves from right to left, or vice versa. The water is supplied to the inner enclosure within wall 47 of the test box 26 to a level sufficient to immerse the tubing substantially entirely therein. The inspection probes 62 similarly are submerged below the level of the water contained within the wall 47. The water thus provides a couplant for transmission of sound waves emitted from the probes 62 to the tubing and reflected back to the probes 62. This arrangement enables continuity of movement of tubing through the production line uninterruptedly while maintaining a constant supervision and inspection of the welded seam in the tubing.

The seal assemblies 51 serve not only to maintain a seal on the tubing to prevent leakage of water therealong from within the inner enclosure wall 47 but also, by providing an air space between the inner rubber layers 53, serve to dampen shock waves, arising from the subsequent cutting-off operation, which may interfere with operation of the ultrasonic inspection devices 49.

While a presently preferred embodiment of my invention has been specifically described herein, it will be apparent that modifications and alterations may be made therein within the terms of the appended claims.

I claim:

1. Ultrasonic apparatus for testing the integrity of welded steel tubing moving therethrough, said apparatus comprising a test box enclosure through which welded tubing to be tested is moved, ultrasonic transducer means carried in a fixed position on said enclosure, means movably mounting said enclosure, and means fixed to said mounting means for tracking said tubing and effecting movement of said test box enclosure according to deviations in the path of movement of said tubing to maintain a uniform physical relation between the said transducer means and the tubing, said tracking means comprising a plurality of aligned rollers attached to said test box enclosure and each roller having a concave surface on which tubing is supported for movement through said enclosure.

2. Ultrasonic apparatus for testing the integrity of welded steel tubing according to claim 1, wherein said means movably mounting the enclosure comprises a platform member on which said test box enclosure is removably attached, means movably mounting said platform member for free lateral movement, and base means yieldingly supporting said platform member via said movably mounting means and urging said rollers in biased relation to the tubing.

3. Ultrasonic apparatus for testing the integrity of welded steel tubing according to claim 2, wherein the said means movably mounting the platform member comprises a plurality of carrier shafts in parallel relation to each other, anti-friction bearing members attached to and mounting said platform member on said carrier shafts for lateral movement relative to the path of movement of the tubing, said aligned rollers attached to said test box enclosure being effective upon lateral deviation of the tubing from a predetermined path of movement to move responsively according to the lateral deviation of the tubing to correspondingly laterally move the platform member and the test box enclosure secured thereon.

4. Ultrasonic apparatus for testing the integrity of welded steel tubing according to claim 1, wherein said test box enclosure comprises a base member, an inner enclosure wall attached to said base member on which said ultrasonic transducer means is supported and an outer enclosure wall, attached to said base member in surrounding relation to the said inner enclosure wall.

5. Ultrasonic apparatus for testing the integrity of welded steel tubing according to claim 3, wherein said base means supporting said carrier shafts, comprises spring means for resiliently supporting said carrier shafts and urging said rollers upwardly against the tubing resting thereon, whereby said test box follows correspondingly any vertical deviation of the tubing from a predetermined path of movement.

6. Ultrasonic apparatus for testing the integrity of welded steel of tubing according to claim 4, wherein said inner enclosure wall has an inlet via which liquid is introduced therein and wherein said outer enclosure wall has an outlet via which to drain liquid which overflows said inner enclosure wall.

7. Ultrasonic apparatus for testing the integrity of welded steel tubing according to claim 4, wherein said inner enclosure wall comprises two wall sections in spaced substantially parallel relation, said wall sections having respective openings in aligned relation to each other, and seal assemblies mounted on said wall sections within said openings for providing a seal on the tubing so as to contain liquid within the said inner enclosure wall to a level to effect immersion of the said transducer means and of the tubing as it moves through the space within said inner enclosure wall.

8. Ultrasonic apparatus for testing the integrity of welded steel tubing according to claim 4, wherein said outer enclosure wall is relatively low in height above said base member compared to the said inner enclosure wall, and wherein said plurality of concave rollers are so mounted on the said base member as to support the tubing for movement through the space within the inner enclosure wall at a level above the said outer enclosure wall.

9. Ultrasonic apparatus for testing the integrity of welded steel tubing according to claim 5, wherein said base means comprises a main base having a rectangular shape with a vertical guide block at each of the four corners thereof in which guide rods are telescopically supported, a slide base having corner guide blocks slidable on said guide rods, and air cylinder means having a piston and piston rod, the latter being connected to said slide base, pressurization of said air cylinder means supporting said slide base in an elevated position in which said biasing means is effective.

10. Ultrasonic apparatus for testing the integrity of welded steel tubing according to claim 7, wherein each of said seal assemblies comprises a sandwich of two outer plates of metal, two inner plates of elastomeric material, a separator strip between the two inner plates, and screw means holding said plates and strips together, the said inner plates having uniform sized openings therein for sealingly engaging the tubing as it moves therethrough, and the said outer plates having uniform sized openings therein slightly larger in cross-section than the openings in the said inner plates.

* * * * *

UNITED STATES PATENT OFFICE
CERTIFICATE OF CORRECTION

Patent No. 3,763,695       Dated October 9, 1973

Inventor(s) DONALD L. ZEITERS

It is certified that error appears in the above-identified patent and that said Letters Patent are hereby corrected as shown below:

The assignee, indicated as "COPPERHEAD STEEL COMPANY" should read --COPPERWELD STEEL COMPANY--.

Column 2, line 44, "medidum" should read --medium--.

Column 2, line 53, "disosed" should read --disposed--.

Column 3, line 23, "45" should read --46--.

Column 3, line 59, "enclousre" should read --enclosure--.

Column 3, line 61, "stradling" should read --straddling--.

Signed and sealed this 2nd day of April 1974.

(SEAL)
Attest:

EDWARD M. FLETCHER, JR.
Attesting Officer

C. MARSHALL DANN
Commissioner of Patents